UNITED STATES PATENT OFFICE.

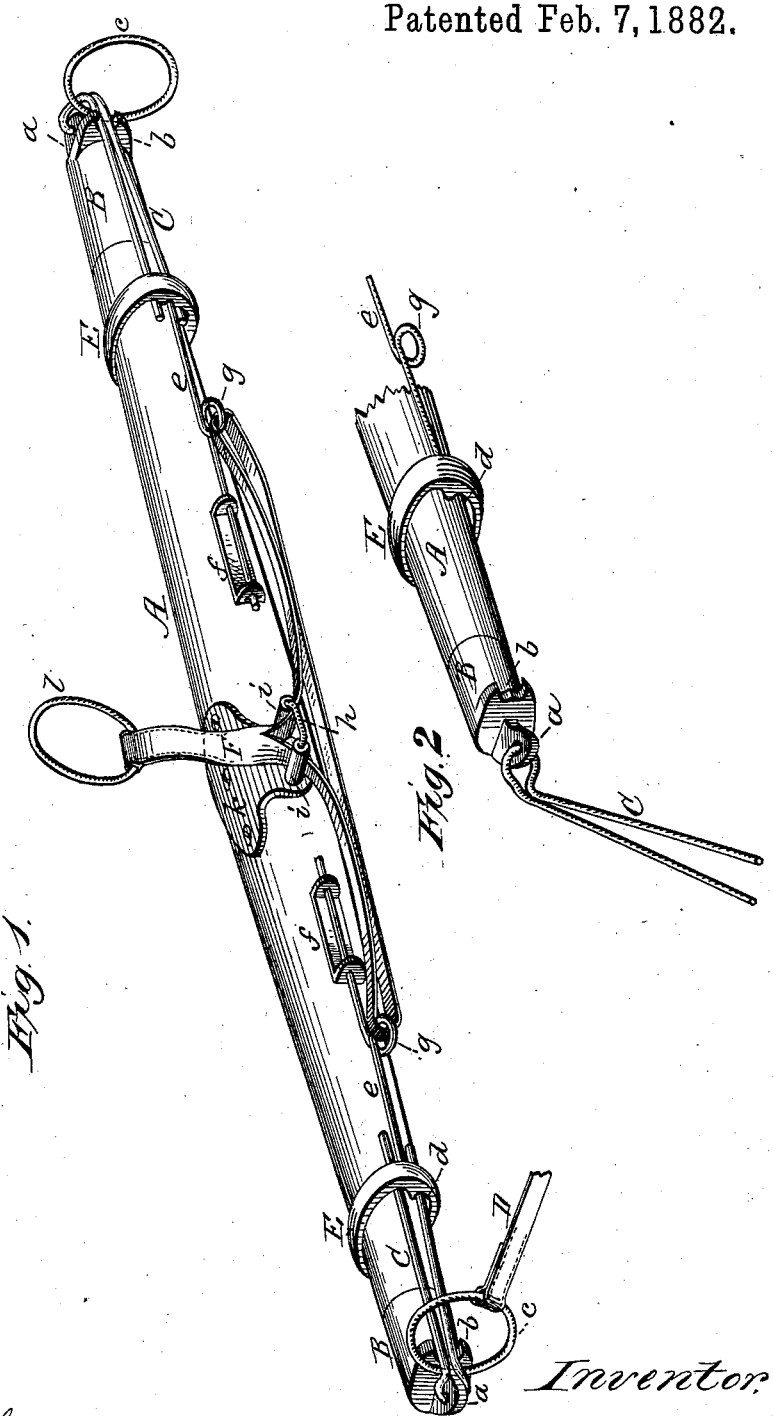

JOHN GASSMANN, OF JACKSON, MISSOURI.

HORSE-DETACHER.

SPECIFICATION forming part of Letters Patent No. 253,367, dated February 7, 1882.

Application filed November 28, 1881. (Model.)

*To all whom it may concern:*

Be it known that I, JOHN GASSMANN, an alien of the Republic of Switzerland, having made declaration in competent court to become a citizen of the United States, residing at Jackson, in the county of Cape Girardeau and State of Missouri, have invented certain new and useful Improvements in Self-Detaching Single-Trees; and I do hereby declare that the following is a full, clear, and exact description of the same, reference being had to the annexed drawings, making a part of this specification, and to the letters and figures of reference marked thereon.

Figure 1 of the drawings is a perspective view of my invention; and Fig. 2 is a detail view, in perspective, of one of the ends of the single-tree, showing the wire locking-arms released from the clamping-ring.

The present invention has relation to that class of devices connected to a single-tree whereby the traces may be readily disconnected therefrom by the occupant of the vehicle, in order to prevent the runaway horse or horses from taking it with them.

The invention consists in certain new, useful, and valuable improvements, substantially as shown in the drawings and hereinafter described.

In the accompanying drawings, A represents the single-tree, having secured at its ends metallic ferrules B, cast with eye-plates $a$ and seats $b$. If desired, the eye-plates and seats may be formed independent of the ferrules and afterward connected in any suitable manner; and it may be considered preferable to form the eye-plates with a screw or other suitable shank, and connect them by driving them through the ends of the single-tree, as I do not wish to be understood as confining myself to any special means of construction so long as it serves the purpose intended.

Connected to the eye-plates $a$ are arms C; and I prefer to form these arms of wire, which I pass through the eye-plates and afterward bend double, as shown. These arms C, I shall term "locking-arms," as they secure or connect the traces, as shown at D, to the ends of the single-tree, the traces being provided with a ring, $c$, snap-hook, or any other convenient means whereby the wire arms C will hold them in connection with the single-tree. The arms C are held down against the whiffle or single tree by a clamping ring, E, which is arranged or adapted to slide thereon, the ring being formed upon its inner periphery with suitable seats, $d$, for the ends of the arm C. These clamping-rings E, which are similarly arranged at each end of the single-tree A, are each provided with a rod, $e$, rigidly connected thereto and running parallel with the single-tree, the inner ends of said rods passing through a guide-plate, $f$. Each rod $e$ is formed with an eye or loop, $g$, through which passes a cord or strap, F, and through a staple, $h$, having friction-rollers $i$. This cord or strap F may be of sufficient length to lead to the vehicle within convenient reach of the driver or other person on the seat, and by pulling on the strap F, which may have a ring, $l$, for convenience of catching hold of said strap as the same is pulled up, it will in turn pull the rods $e$ in a direction toward each other, and with them the clamping-rings E, thereby releasing the arms C and enabling the traces to be automatically released from the ends of the single-tree.

The staple $h$, if desired, may be formed with a plate, $k$, and said plate secured to the single-tree by suitable screws or other fastenings.

Having now fully described my invention, what I claim as new, and desire to secure by Letters Patent, is—

The single-tree A, having connected to its ends locking-arms C, and the seats $b$, in combination with the clamping-rings E, having connected thereto rods $e$, the guide plates $f$, and strap F, constructed and arranged to operate substantially as described, and for the purpose set forth.

In testimony that I claim the above I have hereunto subscribed my name in the presence of two witnesses.

JOHN GASSMANN.

Witnesses:
H. W. HOWARD,
C. H. MACKE.